(12) United States Patent
Van Vliembergen et al.

(10) Patent No.: US 10,877,708 B2
(45) Date of Patent: Dec. 29, 2020

(54) ROLL-FED PRINTING APPARATUS, RASTER IMAGE PROCESSOR, SOFTWARE MEDIUM, METHOD FOR CONTROLLING A ROLL-FED PRINTING APPARATUS, AND METHOD FOR CONTROLLING THE RASTER IMAGE PROCESSOR

(71) Applicant: Océ Holding B.V., Venlo (NL)

(72) Inventors: Eduardus J. W. Van Vliembergen, Venlo (NL); Elsemieke P. A. Van Rossum, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/719,170

(22) Filed: Dec. 18, 2019

(65) Prior Publication Data

US 2020/0125304 A1 Apr. 23, 2020

Related U.S. Application Data

(63) Continuation of application No. PCT/EP2018/067621, filed on Jun. 29, 2018.

(30) Foreign Application Priority Data

Jul. 14, 2017 (EP) .................................... 17181361

(51) Int. Cl.
*G06F 3/12* (2006.01)
*B41J 3/46* (2006.01)
(Continued)

(52) U.S. Cl.
CPC .............. *G06F 3/1251* (2013.01); *B41J 3/46* (2013.01); *B41J 11/663* (2013.01); *B41J 29/38* (2013.01);
(Continued)

(58) Field of Classification Search
CPC .............................. G06F 3/1251; G06F 3/1256
See application file for complete search history.

(56) References Cited

U.S. PATENT DOCUMENTS

| | | | | |
|---|---|---|---|---|
| 7,130,071 B2 * | 10/2006 | Housel | ................... | G06K 15/00 |
| | | | | 358/1.15 |
| 8,386,945 B1 * | 2/2013 | Hansen | ................... | G06Q 10/10 |
| | | | | 715/765 |

(Continued)

FOREIGN PATENT DOCUMENTS

| | | | |
|---|---|---|---|
| EP | 2 640 053 A2 | 9/2013 | |
| EP | 2640053 A2 * | 9/2013 | ........... G06F 3/1219 |
| WO | WO-2019081309 A1 * | 5/2019 | ......... G06F 3/04817 |

OTHER PUBLICATIONS

International Search Report (PCT/ISA/210), issued in PCT/EP2018/067621, dated Jul. 16, 2018.

(Continued)

*Primary Examiner* — Ted W Barnes
(74) *Attorney, Agent, or Firm* — Birch, Stewart, Kolasch & Birch, LLP (57) ABSTRACT

In a roll-fed printing apparatus and a method therefor, a controller receives a plurality of ripped images from a raster image processor in memory of the roll managing system irrespectively of the presence of the least one recording medium in the roll-fed printing apparatus. For each ripped image the roll managing system establishes an arbitrary position in the plane of the at least one recording medium at which arbitrary position the ripped image is intended to be printed. The controller creates subsequent image swathes for printing the ripped images according to the established arbitrary positions of the ripped images. While printing created subsequent image swathes, the roll managing system monitors a first actual status of printing of the created subsequent image swathes, a second actual status of a timing (Continued)

of the ripped images to be printed and a third actual status of the at least one receiving medium.

11 Claims, 5 Drawing Sheets

(51) Int. Cl.
  *B41J 11/66* (2006.01)
  *B41J 29/38* (2006.01)
(52) U.S. Cl.
  CPC .......... *G06F 3/1207* (2013.01); *G06F 3/1208* (2013.01); *G06F 3/1256* (2013.01); *G06F 3/1262* (2013.01); *G06F 3/1282* (2013.01)

(56) References Cited

U.S. PATENT DOCUMENTS

| | | | | |
|---|---|---|---|---|
| 10,185,518 B1* | 1/2019 | Hossepian | ............ | G06F 3/1243 |
| 2001/0043365 A1* | 11/2001 | Kremer | ................ | G06F 3/1204 |
| | | | | 358/1.16 |
| 2002/0114003 A1* | 8/2002 | Housel | ............... | H04N 1/00477 |
| | | | | 358/1.15 |
| 2004/0099166 A1* | 5/2004 | Blom | ..................... | G06K 15/00 |
| | | | | 101/483 |
| 2007/0013940 A1* | 1/2007 | Field | ....................... | B41F 33/16 |
| | | | | 358/1.15 |
| 2007/0253020 A1* | 11/2007 | Hull | ................... | G03G 15/5083 |
| | | | | 358/1.15 |
| 2011/0069329 A1* | 3/2011 | Abe | ....................... | G06F 3/1251 |
| | | | | 358/1.9 |
| 2011/0211857 A1* | 9/2011 | Mikami | ............. | G03G 15/6517 |
| | | | | 399/82 |
| 2012/0081726 A1* | 4/2012 | Nakamaru | ........... | G06K 15/022 |
| | | | | 358/1.12 |
| 2012/0307294 A1* | 12/2012 | Matsuda | ............... | G06F 3/1252 |
| | | | | 358/1.15 |
| 2013/0286410 A1* | 10/2013 | Yasinover | ............. | G06F 3/1242 |
| | | | | 358/1.2 |
| 2015/0277812 A1* | 10/2015 | Kuranoshita | ......... | G06F 3/1252 |
| | | | | 358/1.18 |
| 2016/0231966 A1* | 8/2016 | Ujike | .................... | G06K 15/186 |
| 2018/0020126 A1* | 1/2018 | Weil | ...................... | A63F 3/0665 |
| 2018/0217793 A1* | 8/2018 | Kamijima | ................ | G06F 3/121 |
| 2019/0018628 A1* | 1/2019 | Sloan, IV | ............ | G06Q 10/043 |

OTHER PUBLICATIONS

Search Report Issued in European priority application 17181361, dated Jan. 15, 2018.
Written Opinion of the International Searching Authority (PCT/ISA/237), issued in PCT/EP2018/067621, dated Jul. 16, 2018.

* cited by examiner

ROLL-FED PRINTING APPARATUS, RASTER IMAGE PROCESSOR, SOFTWARE MEDIUM, METHOD FOR CONTROLLING A ROLL-FED PRINTING APPARATUS, AND METHOD FOR CONTROLLING THE RASTER IMAGE PROCESSOR

CROSS REFERENCE TO RELATED APPLICATIONS

This application is a bypass continuation of PCT International Application No. PCT/EP2018/067621, filed on Jun. 29, 2018, which claims priority under 35 U.S.C. 119(a) to patent application Ser. No. 17/181,361.1, filed in the European Patent Office on Jul. 14, 2017, all of which are hereby expressly incorporated by reference into the present application.

FIELD OF THE INVENTION

The present invention generally pertains to a method for controlling a roll-fed printing apparatus for printing images on at least one recording medium, the roll-fed apparatus comprising a print engine and a controller. The present The invention also pertains to a software medium comprising executable code configured to, when executed, perform a method for controlling a roll-fed printing apparatus. The invention also pertains to a roll-fed printing apparatus configured to execute the method according to the invention.

The term "printing" is used herein as a general term for any marking of a recording medium with any marking material. As a synonym, the term "image forming" may be used. Recording mediums may comprise paper, flexible plastic, metal foils, textiles and so on. Marking materials may comprise ink, metal, varnish, toner and so on. "Marking" may be any process by which the marking material is applied to the recording medium.

BACKGROUND ART

Roll-fed printers are a well-known type of printers. In roll-fed printers, a recording medium such as paper is wound up on an input roll and then fed into, and guided along, a path through the printer, unwinding the input roll by and by along the process. In this way, the recording medium is roll-fed (i.e. taken from a roll and fed) to a marking unit of the printer which applies a marking material (prints) onto the recording medium Roll-to-roll printers are a common type of roll-fed printers and are characterized in that the recording medium is, after images have been printed on it, wound up on an output holder of an output roll by and by along the process.

Some roll-fed printers comprise a cutting unit configured to cut the recording medium after images have been printed on it such that the printer does not output the entire contiguous recording medium but instead cut pieces of it.

Roll-fed printers are very efficient devices for forming a large number of images requiring a large amount of the recording medium, as the wound-up input rolls are comparatively easy to handle by both the printers and their operating personnel. Accordingly, little or no supervision by personnel is needed for roll-fed printers, especially for roll-to-roll printers, as the marked recording medium is automatically stored on the output roll.

To utilize as much of the recording medium as possible, a technique called "nesting" is commonly employed. Nesting comprises taking a plurality of individual ripped images and arranging them such in a single, larger image comprising all of the individual ripped images. In this way, multiple individual ripped images may be arranged side-by-side in a direction perpendicular to the direction the recording medium is moving along the path.

However, nesting has a disadvantage that the individual ripped images within the single larger image cannot be manipulated any more when once planned by the controller to be printed on the recording medium.

Moreover, when any problems arise during the printing of the larger image, this may result in a considerable loss of resources such as time (because the printing process might be, or might have to be, stopped until a person can solve the problems) or recording medium and marking material (because a started larger image might be irreparably botched and has to be started anew).

In general images are first prepared with a desktop publishing application on a workstation and then ripped at the same or another workstation by means of an independent raster image processor application. The workstation submits the ripped image to the roll-fed printing apparatus under the constraints that the roll-fed printing apparatus must be ready and the required recording medium is loaded. The raster image processor application may also be running on a same processor unit as the controller of the roll-fed printing apparatus. The independent raster image processor application does not have all needed system parameters of the roll-fed printing apparatus. The independent raster image processor may be an external raster image processor in the sense that the raster image processor is not part of the same module as the processor of the controller, whether the raster image processor is on the same workstation or not.

The operator wants to be in control of the roll-fed printing apparatus with a minimal effort, knowing when the roll-fed printing apparatus needs ink or other consumables or when maintenance actions are required, while taking into account delivery times and a current workload of other departments like finishing. In order to do this he has to look at the local user interface of the roll-fed printing apparatus and at the workstation delivering the ripped images. Usually the workstation is not from the operator's main working place. His main working place is most of the time the desktop publishing station or the finishing department It does take time to send the ripped images to the roll-fed printing apparatus resulting in a less productive printing apparatus. The roll-fed printing apparatus has to wait for the whole bitmap or may take a guess that the network will always be fast enough, which may result in print artifacts, if the roll-fed printing apparatus is forced to pause. Therefore the operator has to load the receiving medium before the ripped images can be submitted.

Moreover, print time estimations of the images in the raster image processor are not very accurate, while the controller of the roll-fed apparatus has more knowledge to make a better estimation. The controller also plans the automatic maintenance actions which are unknown to the independent raster image processor.

When an error occurs at the roll-fed printing apparatus the image has to be resubmitted from the raster image processor. If the image is a nested image containing multiple individual ripped images even the correctly printed individual ripped images will then be reprinted. It takes time of the operator to determine which individual ripped images have already been printed and to create a new nest with the not yet printed images.

Planning ahead on the raster image processor work station is rather difficult if the operator can still make changes on the roll-fed printing apparatus, like changing a number of copies, an order of the images, reprinting an image, deleting an image, adapting margins, etc. But even when this functionality is not offered then still if the operator decides to make a clean cut or spools the recording medium forward because of a stain or something else an amount of available recording medium will change.

It is desirable to have a method for controlling a roll-fed printing apparatus that makes optimum use of the available resources and is flexible in planning individual ripped images intended to be printed. It is also desirable to have a roll-fed printing apparatus capable of executing such a method.

SUMMARY OF THE INVENTION

In a first aspect of the present invention, a method for controlling a roll-fed printing apparatus for printing images on a recording medium is provided. Thereto the controller comprising a roll managing system for managing the printing of the ripped images on the at least one recording medium, the method comprising the steps of the controller receiving a plurality of ripped images from a raster image processor into memory of the roll managing system irrespectively of the presence of the least one recording medium in the roll-fed printing apparatus, for each ripped image the roll managing system establishing an arbitrary position (X,Y) in the plane of the at least one recording medium at which arbitrary position the ripped image is intended to be printed, the controller creating subsequent image swathes for printing the ripped images according to the established arbitrary positions (X, Y) of the ripped images, the print engine subsequently printing the created subsequent image swathes, while printing the created subsequent image swathes, the roll managing system monitoring a first actual status of printing of the created subsequent image swathes, a second actual status of a timing of the ripped images to be printed and a third actual status of the at least one receiving medium; and the roll managing system displaying and keeping up-to-date a dynamic roll preview area representing the at least one recording medium, planned ripped images to be printed on the at least one recording medium, ripped images currently being printed on the at least one recording medium and image items representing the monitored first, second and third actual statuses.

By doing so, the planned ripped images can be printed immediately after each other, since they are already at the roll-fed printing apparatus. The operator is more flexible and remains in control. If the operator plans an image intended to be printed on an unloaded recording medium, it will just result in a recording medium request or in case of a multiple input roll engine in an automatic roll change.

According to the method of the invention, the raster image processor always sends the images to the roll-fed printing apparatus after ripping the images even when the roll-fed printing apparatus is still printing or is not ready or when the recording medium is not yet loaded. The roll managing system is used to actually schedule the ripped images or to reschedule the ripped images in order to get an optimal order. The roll managing system also shows consequences of current choices like recording medium changes, recording medium usage, times when rolls are produced by means of the first, second and third actual statuses.

The roll managing system runs locally on the roll-fed printing apparatus, which means that all printer information is available. It is exactly known which part of a bitmap is already printed, cured, already on the winder, etc.

For each ripped image the roll managing system establishes an arbitrary position in the plane of the at least one recording medium at which arbitrary position the ripped image is intended to be printed. The arbitrary position in the plane of the at least one recording medium means that ripped images may be positioned next to each other in a first direction in the length of a recording medium or next to each other in a second direction in the width of a recording medium.

The dynamic roll preview area representing the at least one recording medium may be displayed on the local user interface of the roll-fed printing apparatus. According to a further embodiment the dynamic roll preview area is offered as a web user interface via a network connected to the roll managing system in the controller of the roll-fed printing apparatus. By doing so, the dynamic roll preview area is made available at a main working place of the operator, or even at different places and/or for different persons at the same time. This is advantageous, since it is a flexible solution that fits with various workflows in different environments.

The roll preview area is a dynamic roll preview area. Ripped images and other digital objects representing operator actions may be manipulated on the roll preview area. Ripped images and other digital objects representing operator actions may be for example dragged and dropped on, moved to, removed from, inserted on a roll preview which represent at least a part of the at least one recording medium.

Ripped images and other digital objects representing operator actions may be edited, changed or adapted. For example an alignment of images on the roll may be changed. Ripped images and other digital objects representing operator actions may be positioned or repositioned by adapting vertical or horizontal distances between ripped images.

According to an embodiment the roll managing system comprises an image list area, and establishing step comprises the sub-steps of for a ripped image of the plurality of ripped images, representing the ripped image as a thumbnail image in the image list area, and receiving the ripped image from the image list area to positions on the dynamic roll preview area, which positions correspond to the established arbitrary positions.

According to a further embodiment the method comprises the step of receiving a user action of dragging a ripped image of the plurality of ripped images from the image list area to the dynamic roll preview area.

According to an embodiment the method comprises the step of automatically determining the established arbitrary positions according to a digital image shelf mechanism residing in the controller of the roll-fed printing apparatus. The digital image shelf mechanism is a mechanism to automatically position a digital representation of a ripped image on the roll preview area at an arbitrary position such that the use of the at least one recording medium is optimized. The digital shelf mechanism is able to position digital representations of ripped images in a lengthwise direction or in a widthwise direction of the at least one recording medium whichever direction leads to a more optimal use of the at least one recording medium.

According to an embodiment the at least one recording medium comprises at least one roll. The roll-fed printing apparatus may be a multiple roll printer which is able to print simultaneously on multiple rolls positioned on a common axis. In the latter case the roll preview area comprises a digital visual representation of each roll and a digital representation of a ripped image may be positioned on either roll.

The invention also pertains to a method for controlling a raster image processor, wherein the method comprises the steps of receiving images to be ripped for printing on a roll-fed printing apparatus, rasterizing the received images, receiving from the roll-fed printing apparatus a first actual status of printing of created subsequent image swathes, a second actual status of a timing of the ripped images to be printed and a third actual status of the at least one receiving medium loaded in the roll-fed printing apparatus, and keeping up-to-date a dynamic roll preview area to be displayed on a user interface connected to the raster image processor based on the first actual status, the second actual status and the third actual status.

The invention also relates to a roll-fed printing apparatus for printing images on at least one recording medium, the roll-fed printing apparatus comprising a controller configured to send media properties of the at least one recording medium in the roll-fed printing apparatus to a raster image processor a print engine configured to deposit marking material in swathes on the at least one recording medium according to the schedule for printing of the images on the at least one recording medium, wherein the controller is configured to receive a plurality of ripped images from the raster image processor irrespectively of the presence of the least one recording medium in the roll-fed printing apparatus and to schedule printing of the plurality of ripped images on the at least one recording medium, and the controller comprises a roll managing system configured to establish for a ripped image of the plurality of ripped images at least one arbitrary position (X,Y) on the at least one recording medium, at which at least one arbitrary position the ripped image is intended to be printed, the controller is configured to create subsequent image swathes for printing the ripped images according to the established arbitrary positions (X, Y) of the ripped images, the print engine is configured to subsequently print the created subsequent image swathes, the roll managing system is configured to monitor a first actual status of printing of the created subsequent image swathes, a second actual status of a timing of the ripped images to be printed and a third actual status of the at least one receiving medium; and to display and keep up-to-date a dynamic roll preview area representing the at least one recording medium, the planned ripped images to be printed on the at least one recording medium, the ripped images currently being printed on the at least one recording medium and image items representing the monitored first, second and third actual statuses.

Preferably, the roll-fed printing apparatus is a roll-to-roll inkjet printing apparatus.

According to an embodiment the controller is configured to send at least one of the first actual status, the second actual status and the third actual status to the raster image processor and the raster image processor is connected to a user interface and is configured to display and keep up-to-date the dynamic roll preview area on the user interface.

The invention also pertains to a raster image processor for rasterizing images into ripped images, the raster image processor configured to receive from a roll-fed printing apparatus a width and media properties of a currently loaded recording medium and to send the ripped images to a roll-fed printing apparatus, wherein the raster image processor is configured to receive from the roll-fed printing apparatus a first actual status of printing of created subsequent image swathes by the roll-fed printing apparatus, a second actual status of a timing of the ripped images to be printed and a third actual status of at least one receiving medium present in the roll-fed printing apparatus, and the raster image processor is configured to keep up-to-date a dynamic roll preview area according to the received first, second and third actual statuses, and the raster image processor is connected to a user interface for displaying the dynamic roll preview area.

The invention also relates to a non-transitory software medium comprising executable code configured to, when executed, perform the method according to the invention.

Additional advantages, and the solution of additional problems, will be apparent from the subject-matter of the dependent claims as well as from the description and the drawings.

BRIEF DESCRIPTION OF THE DRAWINGS

The present invention will become more fully understood from the detailed description given herein-below and the accompanying schematic drawings which are given by way of illustration only, and thus are not limitative of the present invention, and wherein.

DETAILED DESCRIPTION OF THE DRAWINGS

The present invention will now be described with reference to the accompanying drawings, wherein the same reference numerals have been used to identify the same or similar elements throughout the several views, and in some instances throughout the several embodiments.

Figure 1:
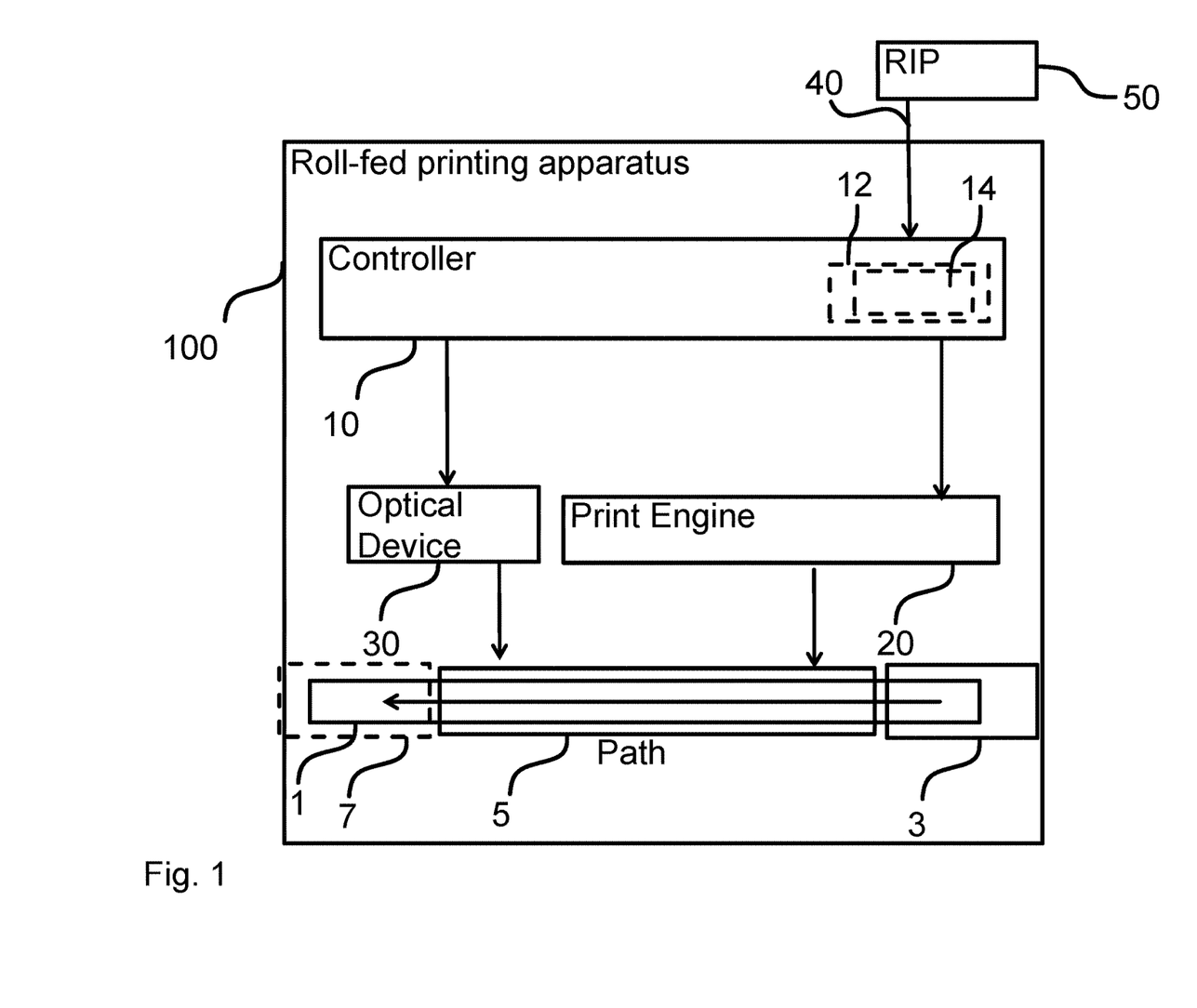
FIG. 1 schematically shows a roll-fed printing apparatus according to the invention and a raster image processor according to the invention.

FIG. 1 schematically shows a roll-fed printing apparatus 100 according to an embodiment. For the following detailed description, reference will also be made to depictions and reference signs in the following FIG. 2 and FIG. 3 which may better illustrate the function of the roll-fed printing apparatus 100 in general and a controller 10 comprising a roll managing system 12 in particular.

In the roll-fed printing apparatus 100, recording medium 1 is initially wound up on an input roll 3 and is therefrom guided, by and by, along a path 5 of the roll-fed printing apparatus 100. If the roll-fed printing apparatus 100 is, specifically, a roll-to-roll inkjet printing apparatus, then the roll-to-roll inkjet printing apparatus may additionally comprise an output roll 7 onto which the recording medium 1 is wound, by and by, after it has been marked according to a print job. The path 5 comprises actors and other components to move, and guide, the recording medium 1 along.

The roll-fed printing apparatus 100 comprises a print engine 20 configured to mark the recording medium 1, using a marking material, in accordance with specifications of the image to be printed. A large number of individual ripped images to be printed may be submitted to the roll-fed printing apparatus 100.

For creating the printed roll, at least one gathering criterion is applied. The at least one gathering criterion may comprise a criterion that the individual ripped images shall be created such that as many of the individual ripped images are able to be printed before a specific resource of, or available to, the roll-fed printing apparatus 100 is depleted to a certain amount or percentage. The percentage may, for example, be zero percent.

The percentage may alternatively be set to a larger percentage than zero, for example, 5% (five percent). In that way, possible errors in the determination, or prediction, of the remaining amount of that resource are taken into account and it is made sure that the last individual ripped images printed are actually printed while the specific resource is still undepleted. For example, it may be undesirable to print until ink is depleted down to zero percent as, at very low ink levels, the printing results and/or the reliability of an ink level estimation may vary.

In the case that more than one gathering criteria are applied, the percentages for all of the criteria may be equal, e.g. zero. There may also be a different percentage set for each, or for a number of, the applied gathering criteria.

The specific resource may be at least one of time, marking material, and the recording medium 1. For roll-fed or roll-to-roll inkjet printing apparatus, for example, the specific resource may be at least one of time, ink, and remaining recording medium upstream of a print head of the inkjet printing apparatus.

A printer controller 10 of the roll-fed printing apparatus 100 is configured to control the roll-fed printing apparatus 100, as will be described in more detail in the following.

The controller 10 comprises the roll managing system 12 for managing the printing of ripped images on the recording medium 1.

The controller 10 is able to receive a plurality of ripped images from an external and independent raster image processor 50 via a digital network connection 40 in memory 14 of the roll managing system 12 irrespectively of the presence of the appropriate recording medium in the roll-fed printing apparatus 100. An appropriate recording medium is for example the recording medium specified for the images to be printed. The receipt of the plurality of ripped images may also be irrespectively of the readiness of the printer, i.e. the printer may be still printing other images.

For each ripped image the roll managing system 12 is configured to establish an arbitrary position in the plane of the recording medium 1 at which arbitrary position the ripped image is intended to be printed, The controller 10 is configured to create subsequent image swathes for printing the ripped images according to the established arbitrary positions of the ripped images. The print engine 20 subsequently prints the created subsequent image swathes.

The roll managing system 12 monitors the first actual status of printing of the created subsequent image swathes, the second actual status of a timing of the ripped images to be printed and the third actual status of the receiving medium 1.

The roll managing system 12 is configured to display and keeping up-to-date a dynamic roll preview area representing the at least one recording medium, the planned ripped images to be printed on the at least one recording medium, the ripped images currently being printed on the at least one recording medium and image items representing the monitored first, second and third actual statuses. The dynamic roll preview area will be further elucidated hereinafter in FIG. 3.

According to another embodiment the raster image processor 50 receives from the roll-fed printing apparatus 100 the first actual status of printing of created subsequent image swathes, the second actual status of a timing of the ripped images to be printed and the third actual status of the at least one receiving medium loaded in the roll-fed printing apparatus 100. These three actual statuses are used by the raster image processor 50 to keep up-to-date a dynamic roll preview area to be displayed on a user interface (not shown) connected to the raster image processor 50 based on the first actual status, the second actual status and the third actual status. Such a user interface may contain a window like the window shown in FIG. 3. The user interface may be a cloud user interface which is connected via a network to the raster image processor 50 and the roll-fed printing apparatus 100. According to a further embodiment the roll managing system 12 is situated in the raster image processor instead of in the roll-fed printing apparatus 100.

Figure 2:
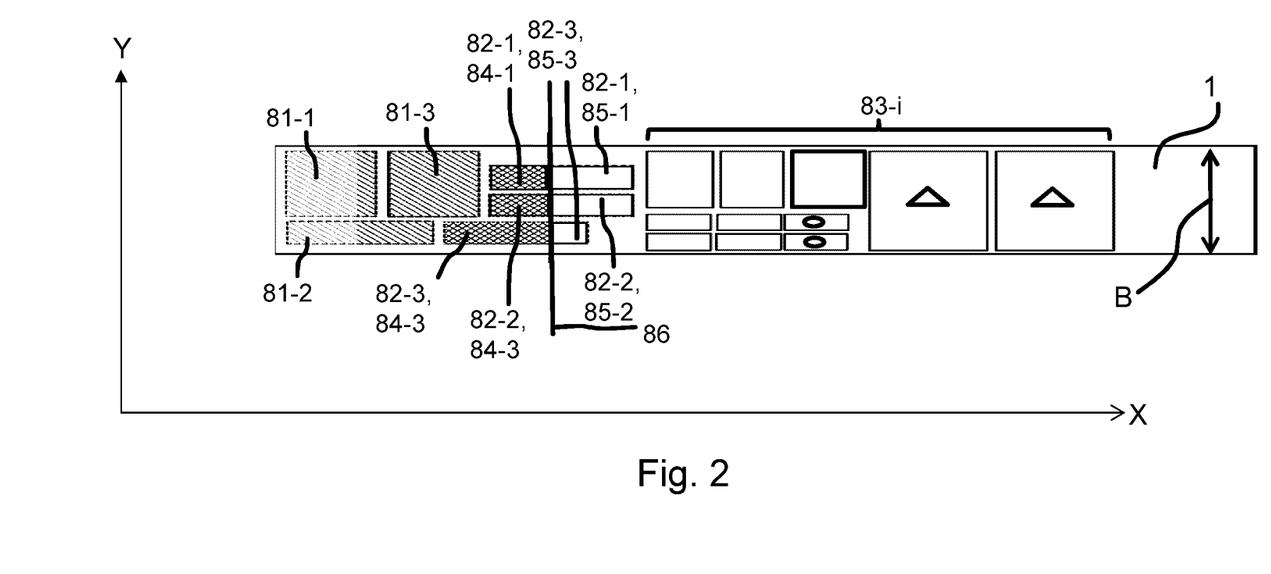
FIG. 2 schematically shows a view of a recording medium for illustrating the function of the roll-fed printing apparatus of FIG. 1 as well as the method of FIG. 4.

In FIG. 2, a schematic view of a recording medium 1 during the printing of a number of sixteen individual ripped images is shown. This number sixteen is only chosen as an example; it should be understood that less, or more, individual ripped images may be printed on the recoding medium. The number of sixteen individual ripped images comprises three individual ripped images designated as 81-1, 81-2, 81-3 (or, collectively, as 81-*i*), three individual ripped images designated as 82-1, 82-2, 82-3 (or, collectively, as 82-*i*), and ten individual ripped images collective designated as 83-*i*, of which two are marked with triangles and two with circles for the following explanation. The right-most area of the recording medium 1 in FIG. 2 is left empty to symbolize that additional individual ripped images might be printed on the remaining length of the recording medium 1.

It is also evident from FIG. 2 that the individual ripped images 81-*i* through 83-*i* are positioned at arbitrary positions with X, Y coordinates along axes X, Y which are respectively parallel to a length direction and to a width direction B of the recording medium 1. The individual ripped images 81-I through 83-I are arranged not only side-by-side along the length of the recording medium 1 (from left to right in FIG. 2) along which the recording medium 1 is moved during the printing of the sixteen images, but also arranged side-by-side along the width B of the recording medium 1 perpendicular to the length of the recording medium 1.

Note that FIG. 2 shows the intended arrangement of the individual ripped images 81-*i* through 83-*i* on the recording medium 1 for the case that there are no error or interruptions and that the printing of the sixteen individual ripped images is carried out on a same recording medium 1.

As an example, the roll-fed printing apparatus 100 may comprise, or make use of, an optical device 30 shown in FIG. 1, preferably an inline optical device, arranged and configured for optically inspecting at least a section of the recording medium 1. That section may, but does not have to be, arranged downstream of the print engine 20 of the printing apparatus 100 (e.g. downstream of a print head of a roll-to-roll inkjet printing apparatus). For example, the optical device 30 may be arranged to scan the printed sections of the recording medium 1 for anomalies such as color loss, damage of the recording medium 1 and so on. Optical device 30 may be implemented as a camera or at least one captor and/or sensor. The camera may, e.g., be of the type RGB or RGB-D.

In FIG. 2, a vertical line symbolizes a current position 86 of the print head within the sixteen individual ripped images. Regarding the following discussion, it is assumed that the current position 86 corresponds to a location along the length of the recording medium 1 at which the print engine 20 is arranged to mark the recording medium 1 currently.

Furthermore the print engine 20 may be a print head moving along the breadth B of the recording medium 1 in reciprocation along a scanning direction. By moving in reciprocation marking material are deposited on the recording medium 1 in swathes.

All parts of the individual ripped images that are positioned to the left (i.e. downstream) of the current position 86 (these parts are shown as hatched in FIG. 2) have been printed; all parts of the individual ripped images that are positioned to the right (i.e. upstream) of the current position 86 (these parts are shown as un-hatched rectangles in FIG. 2) have not yet been printed.

Figure 3:
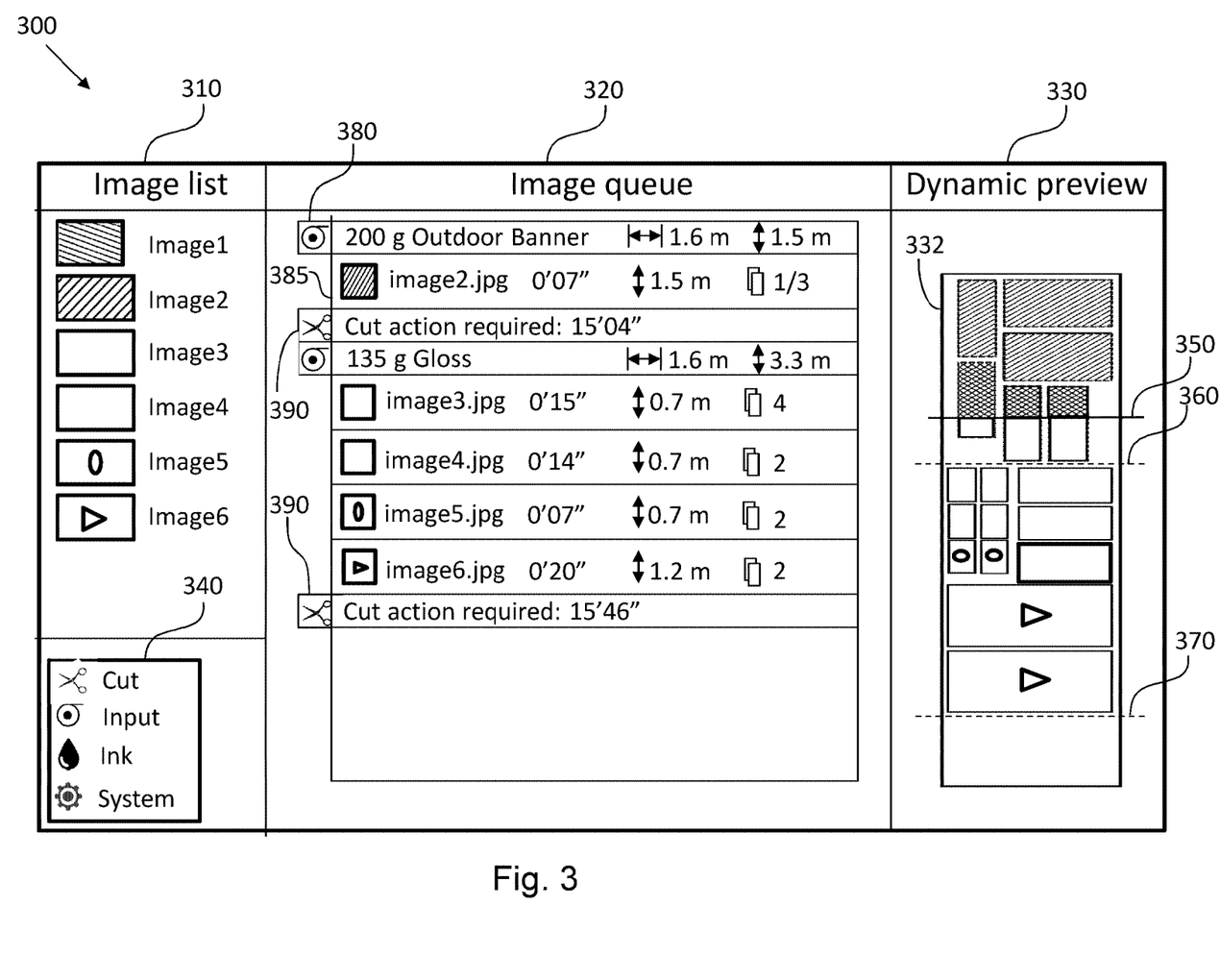
FIG. 3 schematically shows a user interface window for illustrating the function of the dynamic roll preview controlled by the roll managing system of the roll-fed printing apparatus of FIG. 1 as well as the method of FIG. 4.

The terms "downstream" and "upstream" are used here with respect to the representation of the sixteen images on the dynamic roll preview area 330 in FIG. 3 (instead of with respect to the recording medium 1) in the sense that an upstream direction can be designated for the representations of the sixteen images as the direction that would be upstream for the recording medium 1, and equally for the downstream direction.

It is evident from FIG. 2 that the individual ripped images 81-1, 81-2 and 81-3 (collectively: 81-*i*) have been completely printed.

The individual ripped images 83-*i* have not yet been printed even partially. The individual ripped images 82-1, 82-2, 82-3 (collectively: 82-*i*) are intersected by the current position 86 such that each consists of a portion 84-1, 84-2, 84-3, respectively, that has already been printed, and a portion 85-1, 85-2, 85-3, respectively, that has not yet been printed. Accordingly, each of the individual ripped images 82-*i* has not been printed completely (only partially).

The controller 10 may further be configured to control a component of the printing apparatus 100 arranged downstream of the print engine 20 of the printing apparatus 100 in accordance with the sixteen images.

The controlled component may, e.g., by a cutting unit configured to cut the recording medium 1 according to given cut paths or commands entered by the operator or indicated in a user interface window of the roll managing system 12. That controlled component may e.g. also be the optical device 30.

FIG. 3 shows a user interface window 300 controlled by the roll managing system 12. The user interface window 300 comprises an image queue area 320, a dynamic roll preview area 330 and a specification area 340 for specifying finishing actions, recording medium properties, marking material properties and system settings of the roll-fed printing apparatus 100.

According to a further embodiment the user interface window 300 comprises an image list area 310. Note that the image list area 310 is not necessary when the ripped images are received by the controller 10 and automatically added to the image queue represented in the image queue area 320. The image list area 310 comprises images 1-6 which may be dragged and dropped in the image queue area 320 or in the dynamic roll preview area 330.

When an image is dropped in the image queue area 320, the dynamic roll preview area 330 will be automatically updated by adding a representation of the image to the preview 332 of the roll in the dynamic roll preview area 330. When an image is dropped in the dynamic roll preview area 330, the image queue area 320 will be automatically updated by adding a representation of the image to the image queue in the image queue area 320. In other words the image queue area 320 and the dynamic roll preview area 330 are continuously synchronized.

In the example in FIG. 2 image 1—which corresponds to the images 81-*i* in FIG. 2—has already been printed and is not visible any more in the image queue area 320. Image 2 is currently being printed three times according to the specifications of the image 2. The recording medium on which image 2 is being printed is indicated by a recording medium line 380 in the image queue area 320. The image recording medium line 380 shows the type of recording medium, for example "200 g Outdoor Banner", the width of the recording medium, for example 1.6 m., and the roll length currently planned to be printed plus the already printed roll length of the recording medium, for example 1.5 m. The currently planned length or the currently remaining length may be at least part of an indication for the third actual status of the receiving medium according to the invention.

Image 2—which corresponds to the images 82-*i* in FIG. 2—is represented in the image queue area 320 by an image line 385. The image line 385 comprises an identification of the image, for example a corresponding thumbnail and a name "image2.jpg", a time left to print the complete image 2, for example 7 minutes, a length piece of the recording medium which is occupied by the image 2 when printed, for example 1.5 m., and an indication of the number of copies of the image 2 to be printed, for example 3 copies.

The image queue area 320 may also comprise a finishing line 390 comprising an indication for a finishing action like a cutting action and a time indication when the finishing action has to be executed, for example 15h04m or 15h46m. It is noted that after the first cutting action at 15h04m a new roll will be input in the roll-fed printing apparatus 100 as indicated by a recording medium line indicating a recording medium type of "135 g Gloss". The time indication in the finishing line 390 indicates the second actual status of a timing of the ripped images to be printed according to the invention.

The dynamic roll preview area 330 comprises a representation 332 of at least part of the recording medium to be printed upon.

The current position of the print head is reflected in the dynamic preview area 330 by a unbroken line 350. The unbroken line 350 corresponds to the current position 86 of the print head shown in FIG. 2. The unbroken line 350 represents the first actual status of printing of the created subsequent image swathes according to the invention.

The cutting positions corresponding to the first cutting action planned at 15h04m and the second cutting action planned at 15h46m are represented in the dynamic preview area 330 by the dashed lines 360, 370 respectively.

The dynamic roll preview area 330 displays the positions on the roll at which the images are going to be printed. When an operator wants to change a position of an image to be printed on the receiving medium, the representation of the image in the dynamic roll preview area 330 may be moved to another (X,Y) position in the dynamic roll preview area 330. A position of each representation of an image in the dynamic roll preview area 330 is saved to memory 14 in the roll managing system 12 and used by the controller 10 for creation of an appropriate swath image which is going to be printed by the print engine 20.

When a move of an image in the dynamic roll preview area 330 leads to another order of printing the images on the receiving medium, the order of the images in the image queue area 320 will automatically be adapted.

A new finishing line may be introduced in the image queue area 320 by dragging a finishing symbol in the specification area 340, for example a scissor symbol for a cut, to an appropriate position in the image queue area 320 or to an appropriate position in the dynamic roll preview area 330. Only one kind of finishing symbol is shown in the specification area 340, but other kinds of finishing symbols may be envisioned and incorporated.

A new recording medium line may be introduced in the image queue area 320 by dragging a recording medium symbol ("input") in the specification area 340 to an appropriate position in the image queue area 320 or to an appropriate position in the dynamic roll preview area 330. If a width of the new recording medium is deviating from a recording medium are presented in the dynamic roll preview area 330, the width of the new recording medium in the dynamic roll preview area will be automatically adapted upon dropping the recording medium symbol in the image queue area 320 or the dynamic roll preview area 330.

It is noted that the original plan as shown in FIG. 2 of printing the sixteen images on the same recording medium 1, has been altered in the user interface window 300 of the roll managing system 12 by adding the recording medium line indicating "135 g Gloss" to the image queue area 320.

A recording medium line according to the invention is editable in the image queue area 320 for editing the medium type, the width and the (remaining) length of the recording medium to be represented by the recording medium line.

By indicating a time of a cutting action and a subsequent roll change in the finishing action line 390, the operator can plan to have the needed recording medium available at the input section 3 of the roll-fed printing apparatus 100 at the indicated time and he can attend the roll-fed printing apparatus 100 at the indicated time in order to establish a smooth roll change.

FIG. 2 and FIG. 3 show only one recording medium 1 at a time, but the method may also be applied to a roll-fed printing apparatus which is a multiple roll printer which is able to print simultaneously on multiple rolls positioned on a common axis. In the latter case the roll preview area comprises a digital visual representation of each roll and a digital representation of a ripped image may be positioned on either roll.

According to an embodiment the method according to the invention comprises the step of automatically determining the established arbitrary positions (X, Y) on the recording medium 1 according to a digital image shelf mechanism residing in the controller 10 of the roll-fed printing apparatus 100. The digital image shelf mechanism may be based on a first-in-first-out principle whereby the complete width of the recording medium 1 is used to position ripped images next to each other in a width direction of the recording medium 1. In a further embodiment the digital image shelf mechanism may alter the sequence order of printing the ripped images in order to reduce the amount of receiving medium which is needed to print the images, for example to decrease the amount of waste of recording medium.

Figure 4:
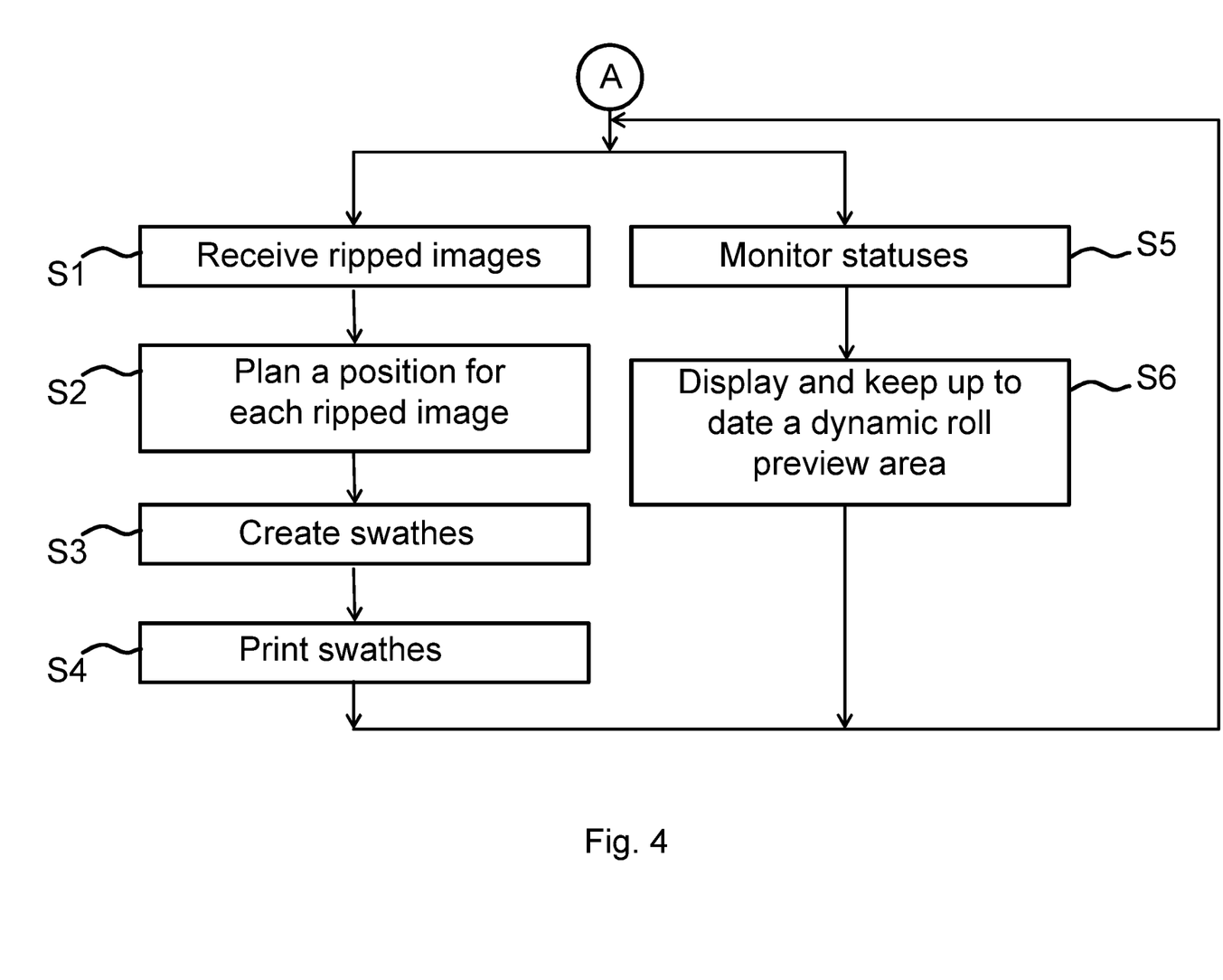
FIG. 4 shows a schematic flow diagram illustrating a method according to the invention.

FIG. 4 shows a schematic flow diagram illustrating a method according to the invention. The method is suitable for controlling a roll-fed printing apparatus for printing images on the at least one recording medium. The roll-fed printing apparatus comprises a print engine and a controller. The controller comprises the roll managing system for managing the printing of ripped images on the at least one recording medium. The method starts in a starting point A and leads to a first step S1 and a fifth step S5.

In the first step S1 the controller receives a plurality of ripped images from a raster image processor in memory of the roll managing system irrespectively of the presence of the least one recording medium in the roll-fed printing apparatus. The raster image processor may be a raster image processor being independently positioned outside the roll-fed printing apparatus. The raster image processor may be a raster image processor incorporated as a software component in the controller of the roll-fed printing apparatus.

In a second step S2 for each ripped image the roll managing system establishes an arbitrary position (X,Y) in the plane of the at least one recording medium at which arbitrary position the ripped image is intended to be printed.

In a third step S3 the controller creates subsequent image swathes for printing the ripped images according to the established arbitrary positions (X, Y) of the ripped images.

In a fourth step S4 the print engine subsequently prints the created subsequent image swathes.

In the fifth step S5, parallel to the steps S1-S4, the roll managing system monitors a first actual status of printing of the created subsequent image swathes, a second actual status of a timing of the ripped images to be printed and a third actual status of the at least one receiving medium. The fifth step S5 is a continuous process step.

In a sixth step S6, parallel to the steps S1-S4, the roll managing system displays and keeps up-to-date a dynamic roll preview area representing the at least one recording medium, planned ripped images to be printed on the at least one recording medium, ripped images currently being printed on the at least one recording medium and image items representing the monitored first, second and third actual statuses. The sixth step S6 is a continuous process step.

After the fourth step S4 the method returns to the first step S1 when a new ripped image intended to be printed arrives at the roll-fed printing apparatus.

Figure 5:
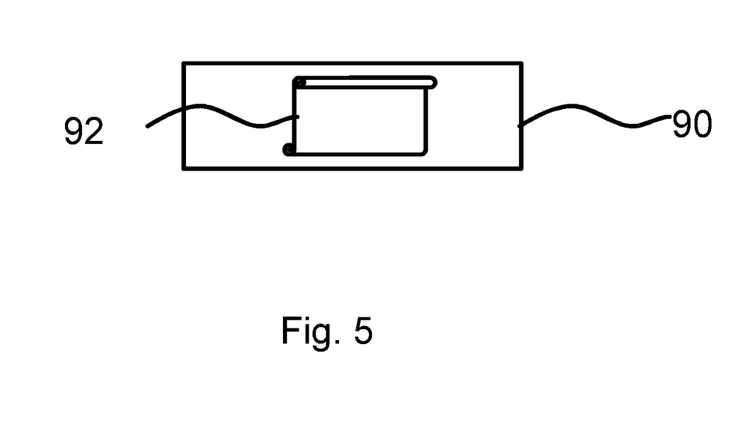
FIG. 5 schematically shows a non-transitory software medium according to the invention.

FIG. 5 schematically shows a non-transitory software medium 90 according to the invention. The software medium 90 comprises executable code 92 configured to, when executed, perform the method according to the invention, e.g. as described with respect to either the roll-fed printing apparatus 100 or the method of controlling the roll-fed printing apparatus 100, according to any or all of the FIGS. 1 to 4 and/or according to any of the variants and modifications of the roll-fed printing apparatus 100 and/or of the method described herein.

The non-transitory software medium may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

The invention claimed is:

1. A method for controlling a roll-fed printing apparatus for printing ripped images on at least one recording medium, the roll-fed printing apparatus comprising a print engine and a controller, the controller comprising a roll managing system for managing the printing of the ripped images on the at least one recording medium, the method comprising the steps of:
   a) the controller receiving a plurality of ripped images from a raster image processor into memory of the roll managing system irrespectively of the presence of the least one recording medium in the roll-fed printing apparatus,
   b) for each ripped image the roll managing system establishing an arbitrary position in the plane of the at least one recording medium at which arbitrary position the ripped image is intended to be printed;
   c) the controller creating subsequent image swathes for printing the ripped images according to the established arbitrary positions of the ripped images;
   d) the print engine subsequently printing the created subsequent image swathes;
   e) while printing the created subsequent image swathes, the roll managing system monitoring a first actual status of printing of the created subsequent image swathes, a second actual status of a timing of the ripped images to be printed and a third actual status of the at least one receiving medium; and
   f) the roll managing system displaying and keeping up-to-date a dynamic roll preview area representing the at least one recording medium, planned ripped images to be printed on the at least one recording medium, ripped images currently being printed on the at least one recording medium and image items representing the monitored first, second and third actual statuses.

2. The method according to claim 1, wherein the dynamic roll preview area is offered as a web user interface connected to the roll managing system via a network.

3. The method according to claim 1, wherein the roll managing system comprises an image list area, and step b) comprises the sub-steps of for a ripped image of the plurality of ripped images,
   representing the ripped image as a thumbnail image in the image list area, and
   receiving the ripped image from the image list area to positions on the dynamic roll preview area, which positions on the dynamic roll preview area correspond to the established arbitrary positions.

4. The method according to claim 3, wherein the method comprises the step of receiving a user action of dragging a ripped image of the plurality of ripped images from the image list area to the dynamic roll preview area.

5. The method according to claim 1, wherein the method comprises the step of automatically determining the established arbitrary positions according to a digital image shelf mechanism residing in the controller of the roll-fed printing apparatus.

6. The method according to claim 1, wherein the at least one recording medium comprises at least one roll.

7. A method for controlling a raster image processor, wherein the method comprises the steps of
   receiving images to be ripped for printing on a roll-fed printing apparatus,
   rasterizing the received images,
   receiving from the roll-fed printing apparatus a first actual status of printing of created subsequent image swathes, a second actual status of a timing of the ripped images to be printed and a third actual status of the at least one receiving medium loaded in the roll-fed printing apparatus, and
   keeping up-to-date a dynamic roll preview area to be displayed on a user interface connected to the raster image processor based on the first actual status, the second actual status and the third actual status.

8. A roll-fed printing apparatus for printing images on at least one recording medium, the roll-fed printing apparatus comprising
   a controller configured to send media properties of the at least one recording medium in the roll-fed printing apparatus to a raster image processor a print engine configured to deposit marking material in swathes on the at least one recording medium according to the schedule for printing of the images on the at least one recording medium,
   wherein
   the controller is configured to receive a plurality of ripped images from the raster image processor irrespectively of the presence of the least one recording medium in the roll-fed printing apparatus and to schedule printing of the plurality of ripped images on the at least one recording medium, and
   the controller comprises a roll managing system configured to establish for a ripped image of the plurality of ripped images at least one arbitrary position on the at least one recording medium, at which at least one arbitrary position the ripped image is intended to be printed,
   the controller is configured to create subsequent image swathes for printing the ripped images according to the established arbitrary positions of the ripped images,
   the print engine is configured to subsequently print the created subsequent image swathes,
   the roll managing system is configured to monitor a first actual status of printing of the created subsequent image swathes, a second actual status of a timing of the ripped images to be printed and a third actual status of the at least one receiving medium; and
   to display and keep up-to-date a dynamic roll preview area representing the at least one recording medium, the planned ripped images to be printed on the at least one recording medium, the ripped images currently being printed on the at least one recording medium and image items representing the monitored first, second and third actual statuses.

9. The roll-fed printing apparatus according to claim 8, wherein the controller is configured to send at least one of the first actual status, the second actual status and the third actual status to the raster image processor and the raster image processor is connected to a user interface and is configured to display and keep up-to-date the dynamic roll preview area on the user interface.

10. A raster image processor for rasterizing images into ripped images, the raster image processor configured to receive from a roll-fed printing apparatus a width and media properties of a currently loaded recording medium and to send the ripped images to a roll-fed printing apparatus,
   wherein the raster image processor is configured to receive from the roll-fed printing apparatus a first actual status of printing of created subsequent image swathes by the roll-fed printing apparatus, a second actual status of a timing of the ripped images to be printed and a third actual status of at least one receiving medium present in the roll-fed printing apparatus, and the raster image processor is configured to keep up-to-date a dynamic roll preview area according to the received first, second and third actual statuses, and the raster image processor is connected to a user interface for displaying the dynamic roll preview area.

11. A non-transitory software medium comprising executable code configured to, when executed, perform the method according to claim 1.

* * * * *